United States Patent Office 3,407,161
Patented Oct. 22, 1968

3,407,161
NONBLOOMING WAX-POLYMER COMPOSITIONS
Victor A. Rundle, Oakland, Calif., assignor to Chevron Research Company, San Francisco, Calif., a corporation of Delaware
No Drawing. Filed Sept. 27, 1965, Ser. No. 490,723
2 Claims. (Cl. 260—28.5)

ABSTRACT OF THE DISCLOSURE

Self-sustaining films prepared from gross amounts of wax and isotactic polypropylene are modified with minor amounts of a high molecular weight $C_2$–$C_4$ polymer other than polypropylene to reduce blooming.

---

This invention concerns improved wax-polypropylene compositions which find use in the formation of films.

Recently, it was found that by combining small amounts of polypropylene of relatively high molecular weight and high stereoregularity, with gross amounts of wax, and extruding the combination to form a film, a highly flexible transparent film having good tensile properties could be obtained. While the film could be used in a variety of packaging applications, it was found that on storing for significant lengths of time the wax would apparently migrate to the surface creating a waxy surface film and reducing the film's transparency. This effect is called blooming. Not only was the blooming undesirable because of the reduction of transparency of the film, but also the wax on the surface of the film would rub off resulting in undesirable adulteration of food or staining of clothing.

The wax-polypropylene film which demonstrated this undesirable blooming generally had from about 30 to 50 weight percent polypropylene and 70 to 50 weight percent wax, usually 60 to 70 weight percent wax and the remainder polypropylene. The polypropylene had a melt flow rate of from about 0.1 to 10 ($N_2$, 230° C., 2,160 g., ASTM 1238–62T, Method L) and preferably a melt flow rate of from about 0.1 to 3. The wax which was used had an AMP (ASTM D 127–60) of about 125 to 200, more usually of about 140 to 180.

It has now been found that blooming in wax-polypropylene films of the compositions described above can be significantly reduced or completely avoided by replacing from about 5 to 10 weight percent of the polypropylene with a polymer having a molecular weight of at least 500,000 and up to about 2,000,000 comprised of olefins of from 2 to 4 carbons, with the obvious exception of polypropylene.

The compositions of this invention are therefore comprised of from 25 to 45 weight percent polypropylene, from 5 to 10 weight percent of a polymer of olefins of from 2 to 4 carbon atoms (except for polypropylene) and the remainder max. Alternatively, the composition may be described as having from 30 to 50 weight percent of polymers of $C_2$–$C_4$ olefins, of which from 25 to 45 weight percent is polypropylene and from 5 to 10 weight percent of another polymer in the $C_2$–$C_4$ range.

The antiblooming additive, as indicated, is a polymer or copolymer of olefins of from 2 to 4 carbon atoms, other than the homopolymer polypropylene. Usually the copolymers will have at least 10 and more usually 20 mol percent of one of the monomers. Illustrative polymers are polyethylene, polybutene-1, copolymers of ethylene and butene-1, ethylene and propylene, etc. The polymers are "Ziegler-type" polymers. That is, they are prepared under relatively mild conditions, low temperatures and pressures, using coordination catalysts employing either titanium or vanadium halides with organo-aluminum compounds and have high densities, the homopolymers being crystallizable.

In preparing the films using the compositions of this invention, the wax high molecular weight stereoregular polypyropylene and antiblooming additive may, optionally, be mechanically mixed prior to extruding, in order to relatively homogeneously distribute the polymers throughout the wax. The polymers may be used in the form of powder, pellets, compacts, or other convenient form and size. The wax will generally be present in the form of a powder or crushable chunks in order to facilitate the mixing of the wax and polymers.

Although the wax and polymers may be directly introduced into the extruder hopper without prior mixing, preferably, the wax-polymer mixture is formed and then extruded in a pelletizer to form pellets of the wax-polymer mixture. The pellets may then be introduced into a film extruder, having a temperature at the extruder head or die above the polymer-wax mixture fusion temperature; generally this will be above the polypropylene melting temperature, i.e., 320° F. Usually, the extrusion temperature will be in the range of about 400° to 550° F.

Various additives may be included with the wax-polymer mixture, such as stabilizers, pigments, slip agents, etc., depending on the particular use for the film.

As the extrudate leaves the die, it is rapidly cooled from the mixture's fusion temperature to a temperature of at least 150° F. below the fusion temperature, preferably at least about 250° to 450° F. below, to bring the temperature of the extrudate to about 30° to 150° F., desirably 50° to 135° F. The time period in which the extrudate is cooled from the melt temperature will generally be about .001 second to 2 seconds, preferably about 0.005 to 0.1 second.

The cooling can be achieved by any convenient mechanical means, by depositing the extrudate on a cooled surface, passing the extrudate through a cooling bath, etc.

The extruded film may be laid directly onto a chill roll or onto a support, e.g., paper, and then rapidly cooled, permitting sufficient time for the wax-polymer film to adhere to the support. To permit rapid efficient cooling throughout the thickness of the film, the film thickness will generally be less than about 20 mils, usually in the range of 0.1 to 10 mils, more usually in the range of about 0.5 to 5 mils.

The films thus formed have excellent flexibility, there being no evidence of cracking or flaking off of the wax when the film is bent or twisted. The films show excellent impact strength and elongation, as well as yield strength, tensile strength and tear strength. For the most part, the films appear homogeneous and remain clear or translucent and free of blooming over long periods of time.

The film's physical properties, e.g., tensile strength, can be improved by orienting the film along the machine and/or transverse direction. Usually, the draw ratio in a single direction would be in the range of 1–9:1, more usually in the range of 1–6:1. When orienting in both directions, the draw ratio in each direction will generally be in the range of about 1–4:1.

The conditions for extruding polypropylene to form polypropylene film, as well as subsequent treatment of the film, are found in "Plastics Extrusion Technology," Allen L. Guff, Reinhold, 1962. Also of interest is Technical Report TR–9, March, 1961, distributed by the Eastman Chemical Products, Inc., Plastics Division.

As indicated, various additives may be included in the wax-polymer composition. These include antioxidants: 2,2'-methylene - 4 - methylphenol, 2,6-di-tertiarybutyl-4-methylphenol, other alkyl substituted phenols commercially available under the trade designation "Santonox"; color stabilizers; epoxydized fatty acids, triphenylphosphate, etc.; dyes; lubricants: calcium fatty acid salts; etc. The amounts of the additives individually or together will rarely exceed 10 percent, usually not exceeding 5 percent of the wax-polymer composition. Generally, the weight of the additives will be in about 0.001 to 2 percent of the wax-polymer composition.

The wax used for the composition is a wax derived from petroleum sources or other wax having similar physical properties. This includes scale waxes, refined waxes and microcrystalline waxes, and combinations of these waxes. The wax will generally have an AMP (ASTM D 127–60) of about 125 to 200, more usually of 140 to 180, and preferably of 145 to 175. The oil content will generally be less than about 10 weight percent and more usually less than about 5 weight percent. The preferred wax is a refined wax, i.e., the wax has been extracted with a suitable solvent to remove oil and other impurities.

The polypropylene is a high molecular weight stereoregular polypropylene, most conveniently prepared by the use of "Ziegler-type" catalysts. These catalysts include a reducible heavy metal compound plus an organo-metal reducing agent. The most common catalysts are the titanium halides, e.g., titanium trichloride, and alkyl aluminum or alkyl aluminum halides, e.g., diethyl aluminum chloride and triethyl aluminum.

The molecular weight of the polypropylene will generally be at least about 200,000 and may be as high as 5 million or more. Preferably, the molecular weight will be in the range of about 250,000 to 1,500,000 (alternatively, the molecular weight may be described as its melt flow rate, MFR, $N_2$, 230° C., 2,160 g., ASTM 1238–62T, Method L). The melt flow rate (MFR) will be in the range of about 0.1 to 10. However, greatly superior tensile properties are obtained with MFR's in the range of about 0.1 to 3, particularly in the range of about 0.1 to 1.0.

The stereoregular polypropylene will generally be isotactic. That is, large numbers of repeating units along the chain will have the same stereoconfiguration. These polymers will generally have at least 75 number percent of the monomers having the same stereoconfiguration, more usually at least about 90 number percent. For the most part, the polypropylene is readily crystallizable and can be induced to crystallize by various means known in the art.

The following examples are offered by way of illustration and not by way of limitation.

Example I

Mixtures were prepared by mixing refined wax 160/165, varying amounts of polypropylene, and an antiblooming additive in a Banbury mixer and the resulting relatively homogeneous mixture heated to 500° F. The fused composition was then used to form a film using a "drawdown" procedure or "doctor-blade" method. The basic method is found in "Painting Testing Manual," 12th ed., 1962, H. A. Gardner et al. The procedure was modified by heating the doctor-blade (Baker film applicator) and one end of the steel drawdown plate to a temperature (400° to 500° F.) which is above the melting point of the wax-polymer blend.

The following table gives the physical property measurements of a variety of films containing polypropylene and antiblooming additive in comparison with a film prepared using 30 weight percent polypropylene and no antiblooming additive. The results reported for elongation and tensile strength were determined according to ASTM D–882–56T (constant rate of grip separation). Testing speed: 20″/min.; distance between jaws: 2.5″.

The sealing strength was determined by preparing samples under the following conditions: sealing the wax-polymer composition to the kraft paper or aluminum at 360° to 410° F. at 16 lb. pressure for 4 seconds, while for the cartonboard the same conditions for 10 seconds were used. The determination of sealing strength was made as follows: A one inch wide by 10 inches long sample (sandwich of two strips) was delaminated on the Instron Tester at 73° F. using a 10″/minute constant rate of grip separation.

The following table indicates the results obtained. The films were all of one mil thickness except where otherwise indicated.

TABLE I

| Polymer present in wax-polymer composition | | Elongation, percent | | | | Tensile strength at yield | | | |
|---|---|---|---|---|---|---|---|---|---|
| Polypropylene,[1] wt. percent | Antiblooming additive,[2] wt. percent | At 70° F. | | At 0° F. | | At 70° F. | | At 0° F. | |
| | | MD[3] | TD[3] | MD | TD | MD | TD | MD | TD |
| 30 | | 520 | 30–400 | 50–400 | [5] 50 | 1,777 | 841 | 2,928 | 0 |
| 30 | $C_2$, 10 | 580 | 570 | 350 | 0 | 2,932 | 1,805 | 2,850 | 0 |
| 30 | $C_3/C_4$, 10 | 645 | 587 | 385 | 0 | 2,740 | 1,700 | 2,900 | 0 |
| 30 | $C_4$, 10 | 640 | 640 | 357 | [5] 400 | 2,803 | 1,380 | 2,820 | 2,040 |
| 25 | $C_2$, 5 | 638 | 83 | Brittle | | 1,507 | 962 | 2,590 | 413 |

| Polymer present in wax-polymer composition | | Tensile strength at break | | | | Sealing strength of 1-mil film, gms./in. to delaminate after sealing between— | | | Bloom[4] |
|---|---|---|---|---|---|---|---|---|---|
| Polypropylene,[1] wt. percent | Antiblooming additive,[2] wt. percent | At 70° F. | | At 0° F. | | Kraft Paper | Cartonboard | Aluminum | |
| | | MD | TD | MD | TD | | | | |
| 30 | | 3,500 | 1,350 | 3,580 | 1,715 | 150 | 23 | 10 | Trace after 1 wk. at 70° F. |
| 30 | $C_2$, 10 | 4,202 | 2,090 | 3,900 | 0 | | | | None after 2 mos. at 70° F. |
| 30 | $C_3/C_4$ 10 | 3,885 | 2,213 | 4,150 | 0 | | | | Trace after 2 mos. at 70° F. |
| 30 | $C_4$, 10 | 3,993 | 2,040 | 3,628 | 2,213 | | | | Do. |
| 25 | $C_2$, 5 | 2,700 | 962 | 2,590 | 413 | 160 | 23 | 10 | None after 2 wks. at 70° F. |

[1] Polypropylene—Isotactic of from 0.1 to 0.4 melt flow rate.
[2] $C_2$—High density polyethylene; ~0.2 melt index (grams/10 minutes at 190° F. and 1,260 g. piston load).
  $C_3/C_4$—Ziegler catalyst polymerized copolymer of propene and butene, ½ mole proportions; approx. $1.5 \times 10^5$ molecular weight.
  $C_4$—Polybutene-1; Ziegler catalyst polymerized; approx. $2 \times 10^6$ molecular weight.
[3] MD—Machine direction. TD—Transverse direction.
[4] The blooming becomes successively worse on standing.
[5] Some of the sample strips broke without elongation.

It is evident from the above data that the antiblooming polymeric additives significantly decrease or avoid any blooming, while for the most part retaining the desirable strength characteristics of polypropylene and providing new advantages in the properties of the film. For example, elongation and sealing strength is greatly enhanced with the use of polybutene, with only minor loss of tensile strength.

As will be evident to those skilled in the art, various modifications on this invention can be made or followed, in the light of the foregoing disclosure and discussion, without departing from the spirit or scope of the disclosure or from the scope of the following claims.

I claim:
1. A self-sustaining film of from 0.1 to 20 mil thickness comprising from 25 to 45 weight percent stereoregular polypropylene of from 0.1 to 10 melt flow rate, from 70 to 50 weight percent wax of from 125 to 200 AMP and from 5 to 10 weight percent of a polymer selected from the group consisting of polyethylene, poly-1-butene and copolymers of olefins of from 2 to 4 carbon atoms, wherein each of the olefins present will be present in at least 20 mole percent, and wherein said polymer has a molecular weight of at least 500,000 and up to 2,000,000.
2. A film according to claim 1, wherein said polymer is polyethylene.

References Cited

UNITED STATES PATENTS

| 3,243,396 | 3/1966 | Hammer. |
|---|---|---|
| 3,322,708 | 5/1967 | Wilson. |
| 3,217,073 | 11/1965 | Olson. |
| 3,243,395 | 3/1966 | Guillet. |

FOREIGN PATENTS

| 849,389 | 8/1960 | Great Britain. |
|---|---|---|

MORRIS LIEBMAN, *Primary Examiner.*

B. A. AMERNICK, *Assistant Examiner.*